United States Patent [19]

Bayer

[11] 4,299,639

[45] Nov. 10, 1981

[54] METHOD FOR THE PRODUCTION OF LAMINATES WITH SPACED-APART GLASS PANES

[75] Inventor: Franz Bayer, Elzach, Fed. Rep. of Germany

[73] Assignee: Franz Xaver Bayer Isolierglasfabrik KG, Elzach, Fed. Rep. of Germany

[21] Appl. No.: 822,901

[22] Filed: Aug. 8, 1977

[30] Foreign Application Priority Data

Aug. 7, 1976 [DE] Fed. Rep. of Germany ....... 2635641
Jun. 25, 1977 [DE] Fed. Rep. of Germany ....... 2728762

[51] Int. Cl.³ .................... B32B 31/06; B32B 17/10
[52] U.S. Cl. ................................. 156/104; 156/99; 156/107; 156/242; 156/286; 264/102; 264/261; 428/38; 428/426; 428/911
[58] Field of Search ............... 156/99, 101, 104, 242, 156/286, 103, 107, 145, 312; 428/34, 911, 38, 426; 264/261, 46.5, 102

[56] References Cited

U.S. PATENT DOCUMENTS

| | | | |
|---|---|---|---|
| 1,937,396 | 11/1933 | Watkins | 156/99 X |
| 3,382,137 | 5/1968 | Schreiber et al. | 156/99 X |
| 3,509,015 | 4/1970 | Wismer et al. | 156/99 X |
| 3,531,346 | 9/1970 | Jameson | 428/34 X |
| 3,575,756 | 4/1971 | Maus | 156/104 X |
| 3,703,425 | 11/1972 | Delmonte et al. | 156/104 X |
| 3,822,172 | 7/1974 | Rullier | 428/34 |
| 3,933,552 | 1/1976 | Shumaker | 156/104 |
| 4,014,733 | 3/1977 | Loubet | 156/499 X |

FOREIGN PATENT DOCUMENTS

| | | |
|---|---|---|
| 658565 | 4/1938 | Fed. Rep. of Germany . |
| 2415707 | 10/1975 | Fed. Rep. of Germany . |
| 2281830 | 3/1976 | France . |
| 560000 | 3/1944 | United Kingdom . |

OTHER PUBLICATIONS

Beattie, John O., "Casting Plastics Sheets", *Modern Plastics*, Jul. 1956, pp. 109-117.

*Primary Examiner*—Robert A. Dawson
*Attorney, Agent, or Firm*—Peter K. Kontler

[57] ABSTRACT

A shatter-, bullet- and/or soundproof laminate is assembled of two or more parallel glass panes and one or more layers of transparent synthetic plastic material, one layer between each pair of neighboring panes. The laminate is assembled while the lowermost pane is supported from below in a horizontal or nearly horizontal plane, and the plastic material is admitted in a liquid state by way of one or more rigid or deformable tubes which extend from the outside into the spaces between neighboring panes. At the same time, one or more additional tubes establish one or more paths for expulsion of air from such spaces. The panes can be pivoted, tilted and/or turned in the course of admission of plastic material. The tubes extend through removable or permanently installed strip- or bead-shaped seals which are disposed between or surround the marginal portions of the panes and seal the spaces between the panes from the surrounding atmosphere. The plastic material can be admitted in metered quantities, especially for the production of a long series of identical laminates.

34 Claims, 18 Drawing Figures

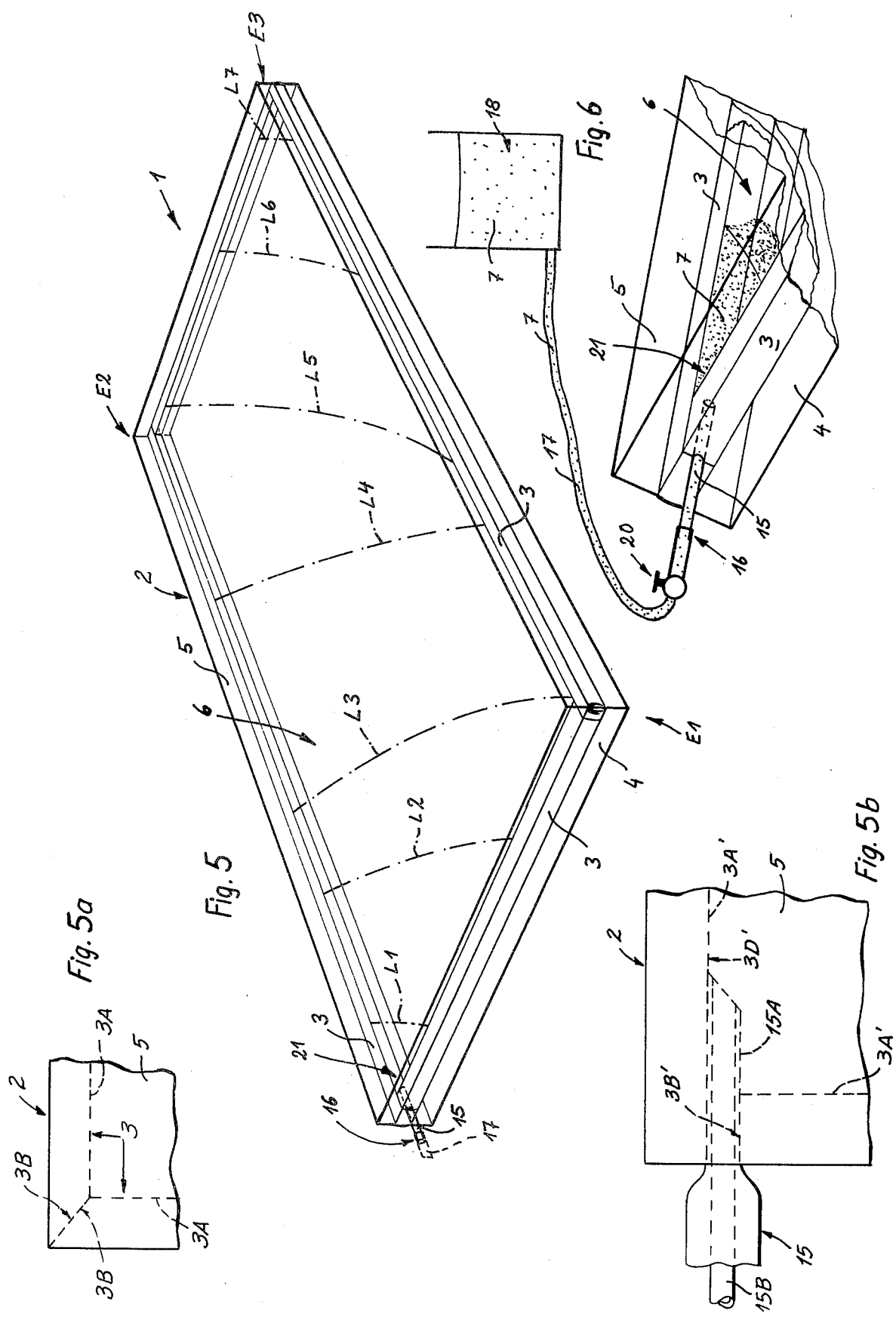

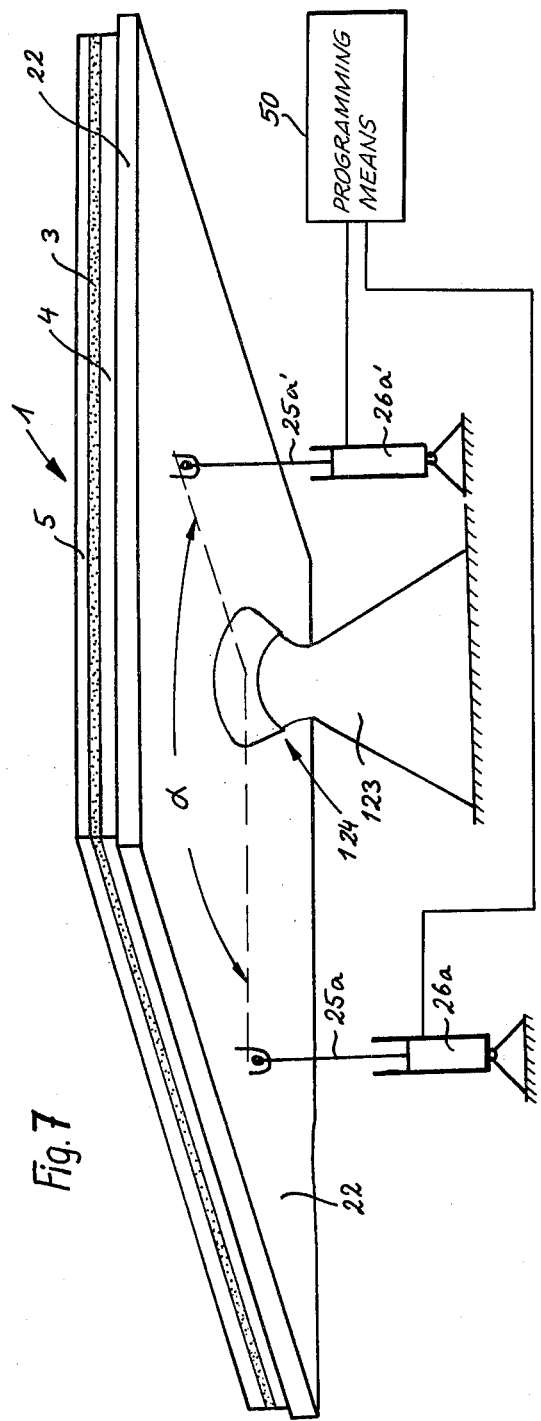

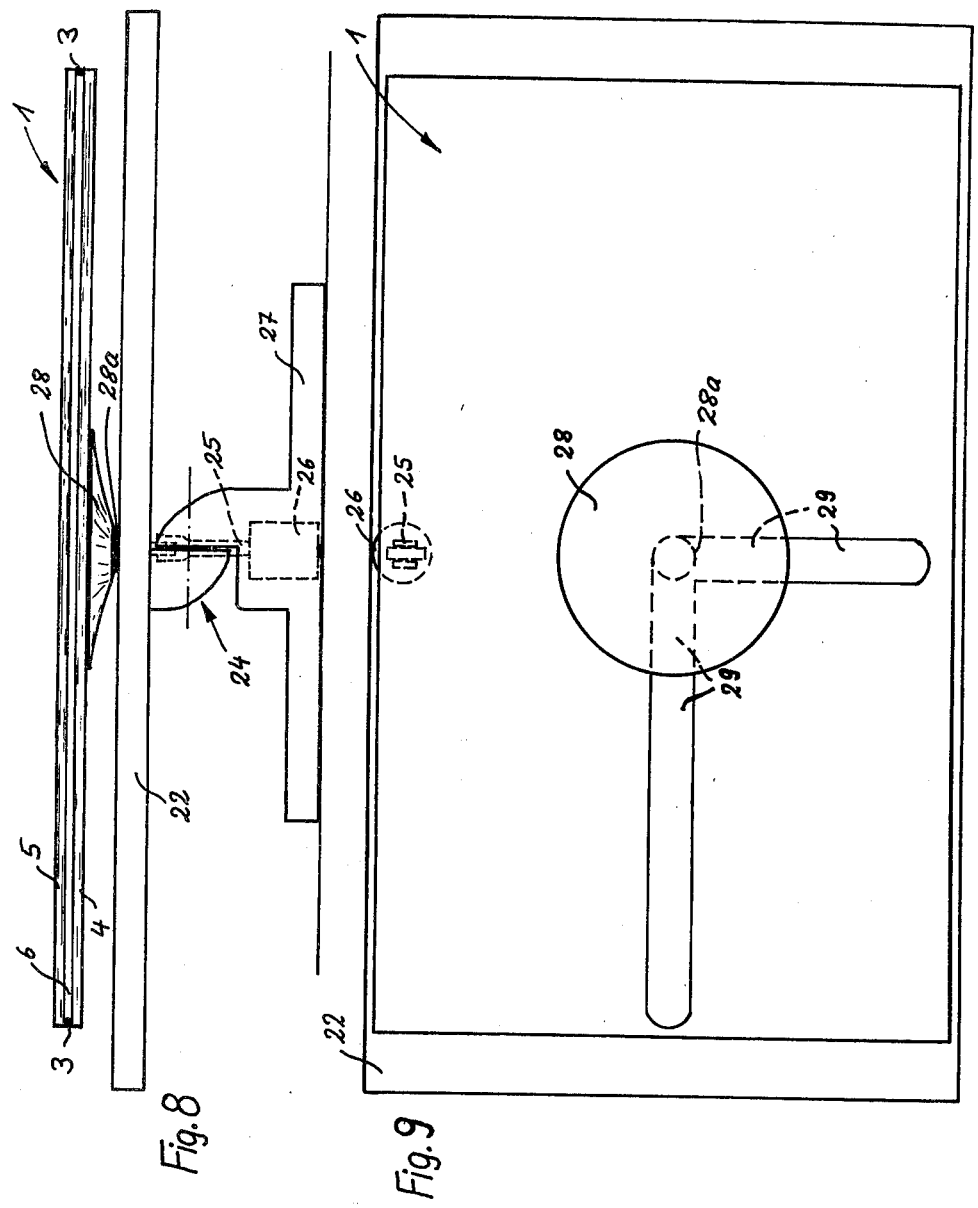

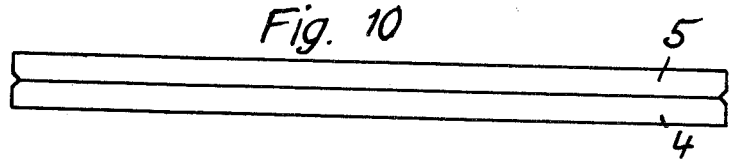
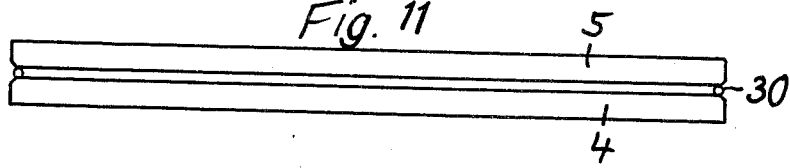
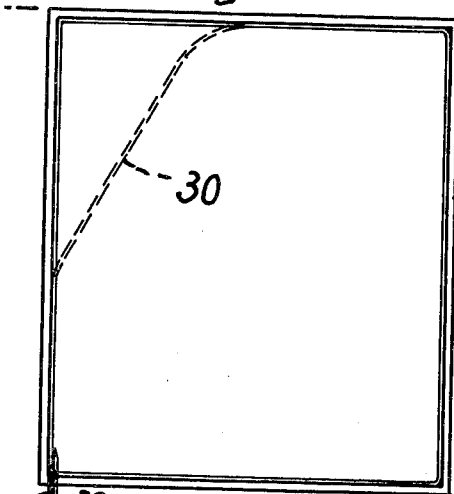
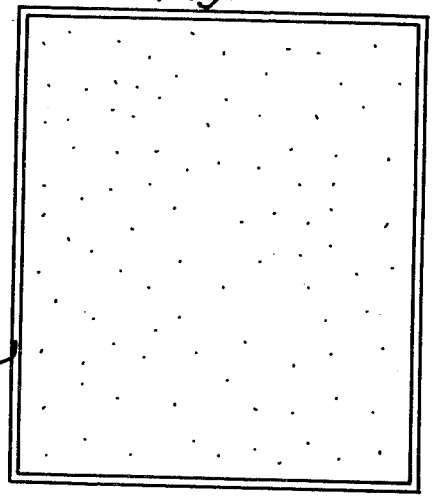
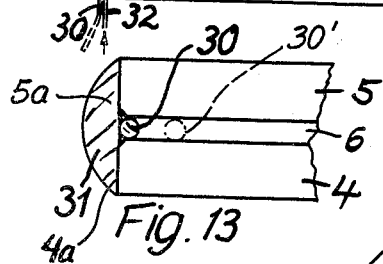
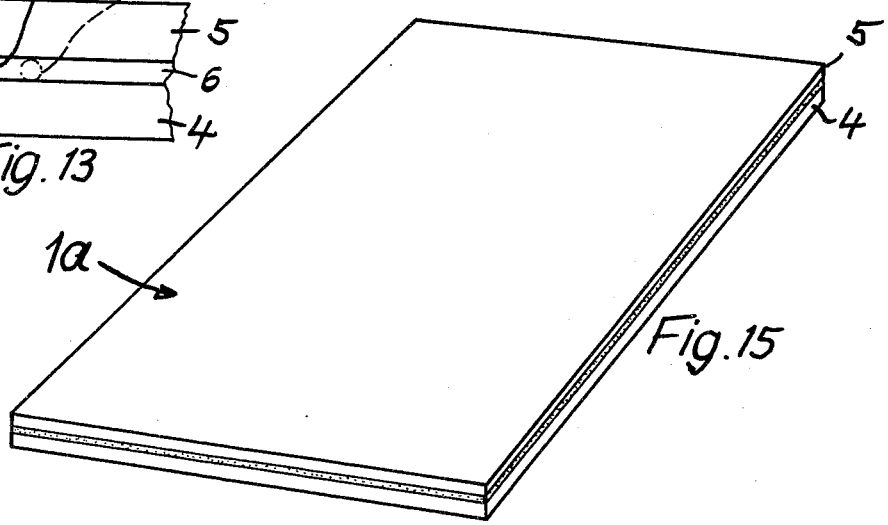
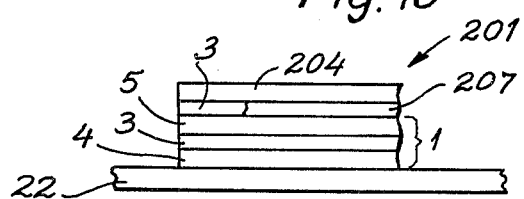

METHOD FOR THE PRODUCTION OF LAMINATES WITH SPACED-APART GLASS PANES

BACKGROUND OF THE INVENTION

The present invention relates to a method and apparatus for the production of shatterproof, bulletproof and/or soundproof laminates consisting of two or more glass panes and shatter-, bullet- and/or soundproofing material between the panes. The invention also relates to the ultimate product, i.e., to laminates which can be produced in accordance with the method by resorting to the improved apparatus.

It is already known to produce soundproof laminates by introducing a mass of hardenable light-transmitting synthetic plastic material into the space or spaces between two or more spaced-apart light-transmitting glass panes. Such laminates exhibit a highly satisfactory resistance to penetration of sound. A drawback of presently known methods and apparatus is that they cannot guarantee complete expulsion of air from the space or spaces between neighboring panes; this affects the appearance as well as the soundproofing qualities of the product. Furthermore, presently known methods and apparatus cannot be resorted to for the mass-production of soundproof laminates, and they cannot insure uniform thickness of successively produced laminates and/or of each and every portion of a given laminate. As a rule, the median portions of the panes tend to bulge outwardly in response to admission of flowable (liquid) plastic material at a pressure which is sufficiently high to at least reduce the likelihood of development of air pockets in the spaces between neighboring panes.

Bulging of panes in laminates which are produced in accordance with heretofore known procedures is also attributable to the fact that the space between two neighboring panes receives liquid plastic material while the panes are held in vertical planes. The admitted material flows into the lower part of the space and its hydrostatic pressure suffices to effect an outward flexing of central portions of the panes.

OBJECTS AND SUMMARY OF THE INVENTION

An object of the invention is to provide a novel and improved method which can be resorted to for the mass-production of laminates or for the production of small batches of or individual laminates which are free of air pockets and wherein the glass panes cannot or are unlikely to be deformed during admission and/or setting of plastic material.

Another object of the invention is to provide a method for the production of eye-pleasing laminates whose soundproofing and/or other desirable characteristics can be determined in advance with a high degree of predictability and reproducibility.

A further object of the invention is to provide a novel and improved method of preventing the development of air pockets between the panes of a light-transmitting shatterproof, bulletproof and/or soundproof laminate.

An additional object of the invention is to provide a novel and improved apparatus for the practice of the above-outlined method.

An ancillary object of the invention is to provide the apparatus with novel and improved means for insuring expulsion of air from the space or spaces between neighboring panes of the laminate prior to and/or during admission of liquid plastic material.

Another object of the invention is to provide a novel and improved shatterproof, bulletproof and/or soundproof light-transmitting laminate.

One feature of the invention resides in the provision of a method of producing a laminate wherein a layer of light-transmitting (preferably transparent) synthetic plastic material is sandwiched between two glass panes, particularly a layer whose material enhances the soundproofing qualities of the laminate. The method comprises the steps of locating a first pane in a substantially horizontal plane, moving a second pane to a position of substantial parallelism with and above the first pane, maintaining the second pane at a predetermined distance (e.g., 0.5 to 10 millimeters, preferably more than one millimeter) from the first pane so that the first and second panes define a flat space or gap of at least substantially constant height, sealingly securing the panes to each other all the way around the space, establishing a first path for admission of liquefied or liquid synthetic plastic material into the space at least at one first location between the panes and simultaneously establishing a second path for expulsion of air from the space at least at one second location which is disposed between the panes and is remote from the first location (the second location is preferably disposed opposite the first location), and causing (i.e., allowing or inducing) the plastic material to set.

The aforementioned maintaining and securing steps may include placing a seal between the marginal portions of the first and second panes. The aforementioned paths then extend through the seal. The first path is preferably closed (e.g., by plugging the opening in the seal) not later than upon completion of the setting step. If the maintaining and securing steps include the placing of a seal between the marginal portions of the panes, the method preferably further comprises the steps of assembling the seal of a hard core (e.g., a core having a circular or I-shaped cross section) which prevents a reduction of the height of the space below the predetermined height, and of a binder or envelope which at least partially surrounds the core and sealingly contacts (preferably adheres to) the adjacent surfaces of the first and second panes.

In accordance with a second embodiment of the method, the aforementioned maintaining and securing steps may include placing an elongated distancing element (e.g., a round cord or a flexible tube which may consist of elastomeric material) between the marginal portions of the first and second panes and applying a bead of sealing material (preferably a hardenable translucent or transparent synthetic plastic material) to the marginal portions of the panes around the distancing element. The size and the shape of the two panes are preferably identical, and the second pane is preferably placed into a position of exact register or overlap with the first pane. The aforementioned step of applying the bead then preferably includes coating the edge faces of the panes with the sealing material of the bead so that the median portion of the bead bridges the gap between the edge faces of the two panes. The sealing material of the bead is preferably applied in deformable state and the just discussed second embodiment of the method preferably includes the additional steps of causing the material of the bead to set and withdrawing the distancing element from the interior of the bead (e.g., by way of an opening in the bead) prior to admission of liquefied plastic material into the space between the panes. Such method preferably further comprises the step of increasing the pressure in the space between the panes prior to the withdrawing step so as to reduce the force with which the panes engage the distancing element; this facilitates the extraction of the distancing element. The aforementioned opening for withdrawal of the distancing element through the bead is preferably sealed or plugged prior to admission of liquefied plastic material into the space between the panes; alternatively, such opening can be used to define the first or the second path, i.e., a passage for admission of plastic material or a passage for evacuation of air from the space between the panes. At least the major part of the bead can be removed subsequent to setting of plastic material in the space between the panes. The distancing element can be placed flush or practically flush with the edge faces of the panes so that, when the distancing element is withdrawn, the admitted plastic material completely fills the space between the panes all the way to the edge faces of the panes and is in contact with the bead intermediate the edge faces. If the distancing element is placed inwardly of the edge faces of the panes, the sealing material of the bead extends into the gaps between the marginal portions of the panes, i.e., into contact with the outer sides of the properly inserted distancing element. If the bead is thereupon trimmed by removing that portion thereof which extends outwardly beyond the edge faces of the panes, the remnant of the bead forms a circumferentially complete frame around the layer of plastic material. The material of the bead can be selected in such a way that the frame is practically indistinguishable from the plastic layer between the panes.

The method may further comprise the steps of metering the quantity of liquefied plastic material prior to admission of such material into the space between the panes. The metered quantity of plastic material is preferably selected in such a way that it equals or at least closely approximates the volume or capacity of the space subsequent to withdrawal of the distancing element (if a distancing element is used) so that the admitted plastic material completely fills the space between the panes and contacts the bead. Regardless of whether the method includes or does not include resort to a distancing element, the metered quantity of liquefied plastic material is preferably selected in such a way that the material of the layer completely fills the space without causing any outward bulging of the panes.

The method may further include the step or steps of changing the inclination of the panes in the course of admission of liquefied plastic material so as to promote complete filling of the space between the panes with plastic material. Such inclination or orientation changing step also promotes complete expulsion of air from the space between the panes.

As mentioned above, the seal between the marginal portions of the panes may include a binder which sealingly contacts the adjacent surfaces of the panes. Such binder may consist of an adhesive material, e.g., synthetic rubber such as butyl rubber, most preferably a material which becomes adhesive in response to the application of pressure. The weight of the second panel can suffice to apply the pressure which is necessary to insure that the binder adheres to the marginal portions of both panes.

The panes are preferably polygons, e.g., squares or rectangles. In such instances, the first location (admission of liquefied plastic material) is preferably at or in one corner of the space between the panes, and the second location (locus of expulsion of air from the space between the panes) is preferably located at or in another corner of the space. The two corners are preferably those corners of a rectangular or square laminate which are located diagonally opposite each other. In order to enhance complete filling of the space between the panes with liquefied plastic material, the support for the first pane is preferably tilted or otherwise moved in such a way that a third corner of the laminate (at one side of the corner where the admission of liquefied plastic material takes place) is moved to a level below all other corners, and that a fourth corner (at the other side of the one corner) is thereupon moved to a level below all other corners. If the laminate is a rectangle, the distance between the one corner and the third corner is preferably less than the distance between the one corner and the fourth corner. Complete filling of the space between the panes with liquefied plastic material can be further enhanced if the inclination of the panes with respect to a truly horizontal plane is changed simultaneously with turning of the panes about an axis which is substantially or exactly normal to their planes (i.e., about a substantially vertical axis).

If the aforementioned maintaining and securing steps include placing a seal between the marginal portions of two square or rectangular panes which are in exact register with each other, the first location is preferably at one corner. The seal is preferably of finite length and has two faces (e.g., a side face and an end face) which are adjacent each other at the just mentioned corner. The step of establishing the first path then preferably includes inserting a rigid or deformable tube between the two faces of the seal so that liquefied plastic material can be admitted by way of the tube. If the tube is deformable (e.g., if the tube is an elastic hose), the method preferably further comprises the step of propping the tube from within to insure the establishment of the first path for admission of liquefied plastic material into the space between the panes. The tube can be propped from within by a rigid plug which is withdrawn immediately prior to admission of plastic material or by a rigid tubular insert which can remain therein during admission of plastic material. If the tube is deformable, the method preferably further comprises the step of deforming the tube upon completion of the plastic-admitting step so as to close the first path as soon as the space between the panes is filled with plastic material. It is also possible to provide the tube with a valve or other suitable means for closing the first path as soon as the space between the panes is completely filled.

The step of locating the first pane in a substantially horizontal plane may include attracting the underside of the first pane to a substantially horizontal support, e.g., by suction (this can be achieved by resorting to a suction head which is mounted on the support and can be rotated about its axis and/or shifted in grooves or analogous guide means in or on the upper side of the support). The aforementioned step or steps of changing the orientation or inclination of the panes in the course of admission of plastic material can include tilting the support about a horizontal and/or vertical axis. The aforementioned tube or tubes for admission of plastic material and/or for evacuation of air from the space between the panes can be withdrawn as soon as the plastic material sets.

If the panes are relatively large, it is advisable to establish two or more first paths for admission of liquefied plastic material and/or two or more paths for evacuation of air from the space between the panes. The pressure against the upper side of the second pane can be raised in the course of admission of plastic material in order to further reduce the likelihood of outward bulging of the second pane. It is also possible to connect the second path or paths with a suction generating device, i.e., to draw air from the space between the panes by suction. This also reduces the likelihood of outward bulging of the panes and/or of development of air pockets between the panes.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view of a laminate and of a portion of a modified apparatus for the manufacture of such laminate;

FIG. 5a is a plan view of a corner portion of a laminate which constitutes a slight modification of the laminate shown in FIG. 5;

FIG. 5b is a plan view of a corner portion of the laminate which is shown in FIG. 5;

FIG. 6 is an enlarged perspective view of the upper left-hand portion of the laminate of FIG. 5 and a schematic partly sectional view of the apparatus for the making of such laminate;

FIG. 7 is a schematic perspective view of a further apparatus;

FIG. 8 is a side elevational view of an apparatus constituting a modification of the apparatus which is shown in FIG. 7;

FIG. 9 is a plan view of the apparatus of FIG. 8;

FIG. 10 is a side elevational view of two glass panes which are to form a further laminate;

FIG. 11 illustrates the panes of FIG. 10 and a cord-like distancing element between the panes;

FIG. 12 is a plan view of a blank which includes the parts of FIG. 11 and a bead around the edge faces of the panes;

FIG. 13 is an enlarged fragmentary sectional view as seen in the direction of arrows from the line XIII—XIII of FIG. 12;

FIG. 14 illustrates a laminate which may constitute a final product or an intermediate product;

FIG. 15 is a perspective view of a laminate which is obtained by removing the bead of the laminate shown in FIG. 14; and FIG. 16 is a fragmentary end elevational view of a laminate with three glass panes.

DESCRIPTION OF THE PREFERRED EMBODIMENTS

Figure 1:
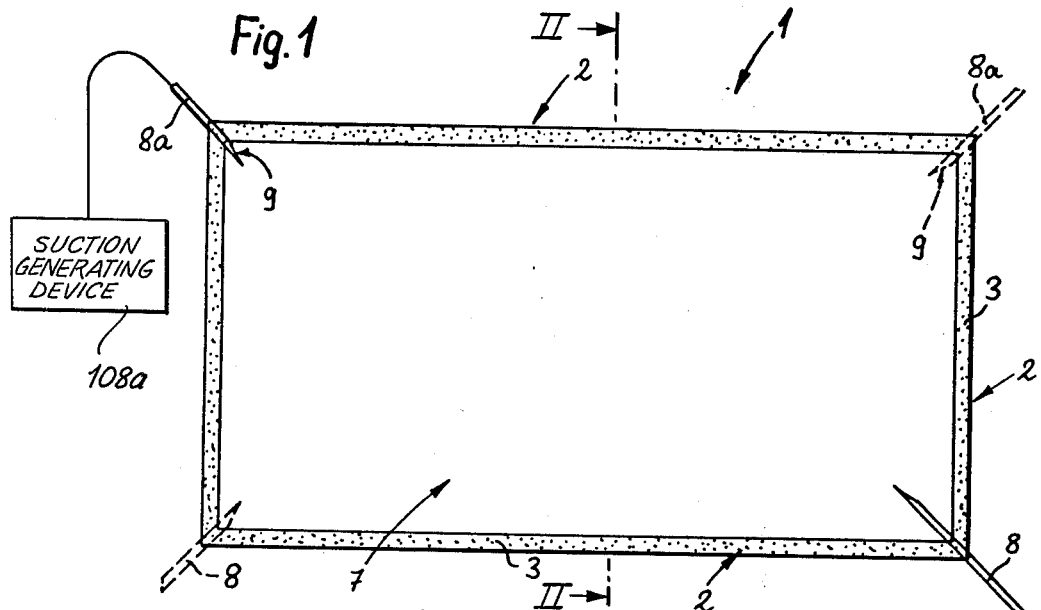
FIG. 1 is plan view of a laminate which embodies one form of the invention, further showing certain component parts of the apparatus which can be utilized for the production of such laminate.
Figure 2:
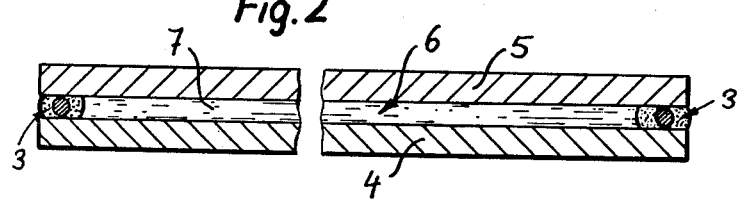
FIG. 2 is an enlarged fragmentary sectional view as seen in the direction of arrows from the line II—II of FIG. 1.

FIG. 1 shows a rectangular laminated structure 1 (hereinafter called laminate for short) which is designed primarily to serve as a soundproof wall. The marginal portions 2 of the laminate include a sealing member 3 (hereinafter called seal for short) which is disposed between two overlapping parallel spaced-apart registering glass panes 4 and 5 (see FIG. 2). A flat space or gap 6 between the panes 4 and 5 is filled with a transparent or translucent synthetic plastic material 7. The material 7 forms an intermediate layer which completely fills the space 6 between the two panes 4 and 5 and is completely surrounded by the seal 3.

The laminate 1 is produced as follows:

The pane 4 is placed onto a horizontal or nearly horizontal support (such as a platform 22 shown in FIG. 7), and the seal 3 is applied to the upper side of its marginal portion. The pane 5 is thereupon placed on top of the seal 3 so that it does not touch the pane 4 and that the panes 4 and 5 define the aforementioned space 6. The seal 3 preferably consists of or includes an outer stratum or binder of tacky material so that it adheres to the marginal portions of the panes 4 and 5. For example, the seal 3 may consist of or include an outer stratum or binder of tough elastic adhesive material, such as synthetic rubber, especially butyl rubber which is known for its leakproof qualitites. In the next step, the space 6 is filled with liquefied plastic material 7. As shown in FIG. 1, the means for admitting plastic material may include one or more tubes 8 which are connected to an injector. Air which fills the space 6 prior to admission of plastic material 7 is allowed to escape by way of one or more additional tubes 8a. It is preferred to place each tube 8a diagonally opposite a tube 8; this reduces the likelihood of escape of liquid plastic material prior to complete filling of the space 6 and also the likelihood of development of air pockets between the panes 4 and 5.

When the laminate 1 is a polygonal body, the tubes 8 and 8a are preferably introduced at the corners so that they extend through the respective portions of the seal 3. For example, and referring to FIG. 1, a single tube 8 can be introduced substantially diagonally through the seal 3 in the lower right-hand corner of the laminate 1, and a single tube 8a can be introduced through the seal 3 (again substantially diagonally) in the upper left-hand corner of the laminate. If the laminate is relatively large, the admission of plastic material 7 can be effected by way of at least two tubes 8 (a second tube 8 is shown in the lower left-hand corner of FIG. 1 by broken lines) and the evacuation of air can be effected by resorting to one or more additional tubes 8a (a second tube 8a is shown in the upper right-hand corner of FIG. 1 by broken line). In order to facilitate the penetration of tubes 8 and 8a through the seal 3, the front end faces 9 of the tubes 8 and 8a are preferably inclined relative to (i.e., they make oblique angles with) the axes of the respective tubes. If the tubes 8 and 8a consist of a metallic material, the slanting front end faces 9 can be formed by grinding.

The tubes 8 and 8a are withdrawn when the space 6 is filled with plastic material 7 and not later than after the material 7 is caused to set. The openings which develop on withdrawal of such tubes 8 and 8a are automatically sealed by the seal 3, especially if the material of such seal is butyl rubber. Thus, it is not even necessary to undertake any additional steps for the purpose of closing the openings which are formed in the seal 3 in response to withdrawal of the tubes 8 and 8a. However, it is equally possible to fill such openings with plugs consisting of a suitable sealing material.

Figure 3:
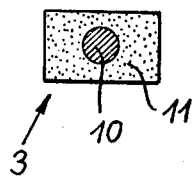
FIG. 3 is an enlarged cross-sectional view of the seal which is used in the laminate of FIGS. 1-2.

FIG. 3 shows that the seal 3 may comprise a distancing portion or core 10 which is surrounded by a mass or binder 11 of adhesive material. The core 10 may consist of metallic or hard plastic material and serves to insure that the distance between the panes 4 and 5 (i.e., the height of the space 6) cannot be reduced below a predetermined minimum value. Furthermore, the core 10 reduces the likelihood of changes in the distance between the panes 4 and 5 in response to possible fluctuations of pressure against the outer sides of the panes 4 and 5. The binder 11 adheres to the inner sides of marginal portions of the panes 4 and 5 and furnishes a reliable sealing action. It is preferred to install the core 10 substantially centrally of the binder 11. FIG. 3 shows that the cross section of the core 10 is round; however, it is equally possible to employ a core having a polygonal, oval or other cross-sectional outline.

Figure 4:
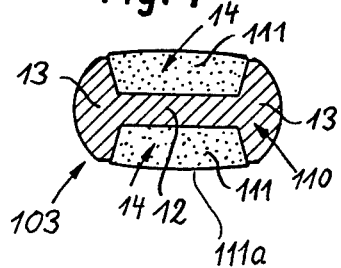
FIG. 4 is a cross-sectional view of a modified seal.

FIG. 4 shows a modified seal 103 having a substantially I-shaped rigid core 110 and a binder consisting of two discrete portions or sections 111 of adhesive material. The adhesive material fills the recesses 14 between a web 12 and flanges 13 of the core 110. The flanges 13 have rounded outer sides and the sections 111 have slightly convex outer sides or surfaces 111a which come into contact with the marginal portions of panes 4 and 5 when the seal 103 of FIG. 4 is used as a substitute for the seal 3 of FIGS. 1 and 2. It will be noted that the sections 111 are disposed at the opposite sides of the web 12.

Laminates embodying seals of the type shown in FIGS. 3 and 4 can be used with advantage for insertion of their marginal portions 2 into slideways, grooves, notches or other recesses of a frame or the like.

It is often sufficient to provide the binder only for selected portions of the core 10 or 110. The core 10 or 110 prevents complete expulsion of the binder 11 or 111 from the space 6 between the panes 4 and 5 and prevents the panes 4 and 5 from reducing the height of the space 6 to zero even if the pressure against the outer sides of the panes 4 and 5 fluctuates within a wide range.

The admission of plastic material 7 into the space 6 between the panes 4 and 5 can be promoted by connecting the outlet(s) of the tube or tubes 8a to a suction generating device (see the device 108a in FIG. 1). The evacuation of air by a suction pump, fan or the like insures that the panes 4 and 5 do not bulge outwardly in response to complete filling and possible overfilling of the space 6, i.e., the device 108a insures that the outer sides of the panes 4 and 5 of the finished laminate remain flat. If the apparatus for making the laminate 1 utilizes a suction generating device, atmospheric pressure at the outer sides of the panes 4 and 5 prevents their bulging, i.e., the thickness of the median or central portion of the laminate 1 is the same as the thickness of the marginal portions 2. The provision of suction generating device 108a is further advisable when the space 6 is to receive a predetermined (metered) quantity of plastic material 7 which is calculated in advance by determining the volume of the space 6. The admission of a metered quantity of plastic material 7 is advisable on the additional ground that the manufacturer can insure complete filling of the space 6 as well as predictable production of a whole series of identical laminates 1 without any outward bulging of the panes 4 and 5. In fact, the pressure at the outer sides of the panes 4 and 5 can be regulated during admission of plastic material 7 to insure that the panes 4 and 5 remain absolutely flat in the course of and subsequent to admission of plastic material. For example, a plenum chamber can be placed against the upper side of the pane 5 while the underside of the pane 4 rests on the upper side of a horizontal support. The underside of the plenum chamber is at least partially open to allow compressed air or another fluid to exert pressure against the pane 5 while the tubes 8 admit plastic material into the space 6. The plenum chamber is connected to a compressor, an accumulator or another suitable source of pressurized fluid, preferably in such a way that the pressure of fluid acting upon the pane 5 can be regulated within a desired range.

It has been found that the soundproofing properties of the laminate 1 are enhanced if the plastic material 7 is selected in such a way that, after setting, the layer which is sandwiched between the panes 4 and 5 constitutes a tough elastic mass. The soundproofing effect of the laminate 1 can be regulated by changing the thickness of the light-transmitting layer between the panes 4 and 5, i.e., by selecting a seal 3 or 103 of appropriate thickness. As a rule, the height of the space 6 (as viewed in FIG. 2) will exceed one millimeter. The range of heights is normally between 0.5 and 10 millimeters.

Referring to FIGS. 5 and 6, the rigid tubes 8 and/or 8a are replaced by or used together with deformable tubular members, e.g., elastic tubes 15 or hoses 15. Such deformable tubes can be used with advantage when the seal 3 is a body of finite length or when the seal 3 consists of several sections which abut against each other at the corners of the laminate 1. For example, the seal 3 of FIG. 5 may consist of four straight sections whose end faces abut against each other at the four corners of the laminate 1 and each of which extends along one of the four marginal portions 2. The end faces of the sections which form a composite seal 3 can be inclined to the longitudinal directions of the respective sections so that they extend diagonally of the laminate 1. The deformable tube 15 of FIG. 5 is then placed between the two end faces which are adjacent to each other in the upper left-hand corner of the laminate 1. The manner in which end faces 3B of two sections 3A of the seal abut against each other is shown in FIG. 5a. Alternatively, end faces 3B' of two of four sections 3A' can abut against side faces 3D' of the other two sections 3A'. This is shown in FIGS. 5 and 5b. The tube 15 then extends between a side face 3D' and the associated end face 3B', i.e., the tube 15 is parallel to one of the adjacent marginal portions 2 of the laminate 1. In order to reduce the likelihood of leakage between the end face 3B' and the side face 3D', that portion of the tube 15 which extends between such end faces 3B' and 3D' is preferably flattened (as at 15A) or otherwise deformed out of round to allow for establishment of a more satisfactory sealing action. Moreover, the hose 15 may be made of a material which is at least slightly elastic; this also contributes to a more satisfactory sealing action between the external surface of the tube 15 and the adjacent sections of the seal 3.

In order to prevent complete closing of the passage in the tube 15 by the sections 3A or 3A' of the seal 3, the interior of the tube 15 may receive a rigid insert which is withdrawn immediately prior to admission of liquid plastic material 7. The insert is shown at 15B in FIG. 5b. The outer end portion of the properly inserted tube 15 is thereupon connected to a supply conduit 17 by a suitable coupling 16 and the conduit 17 is connected to a reservoir 18 or another source of liquid plastic material 7 (see FIG. 6). The upper side of the body of plastic material 7 in the reservoir 18 can be subjected to superatmospheric pressure to promote the flow of such material into the space 6. When the space 6 is filled, further admission of plastic material 7 can be prevented by deforming the tube 15 and/or conduit 17, by tying a knot in the tube 15 and/or conduit 17, by resorting to a suitable clamp (e.g., a paper clip) to flatten the tube 15 and/or conduit 17, or by providing the tube 15 or conduit 17 with a shutoff valve 20 which is closed when the making of the laminate 1 is completed. The valve 20 may be of the type which can be moved between open and closed positions as well as between a plurality of intermediate positions to regulate the rate of flow of plastic material 7 into the space 6.

When the space 6 is completely filled, the plastic material in the tube 15 constitutes a reserve. This is particularly desirable when the material 7 exhibits a tendency to shrink during setting or hardening, i.e., the material which fills the tube 15 flows into the space 6 and compensates for shrinkage of the plastic layer between the panes 4 and 5 within the confines of the seal 3. The material 7 which is confined in the hose 15 can automatically enter the space 6 to compensate for shrinkage of confined plastic material 7 (e.g., by gravity), or the inflow of such reserve into the space 6 can be promoted by deforming the tube 15. The quantity of spare plastic material 7 in the tube 15 can be readily calculated in such a way that it fully compensates for shrinkage of the main supply of plastic material in the space 6. Alternatively, the quantity of spare material 7 can slightly exceed that quantity which is needed to compensate for shrinkage of material 7 in the space 6 during setting. The provision of a reserve of plastic material 7 in the tube 15 is desirable on the additional ground that it prevents the laminate 1 from sucking atmospheric air into the space 6 as a result of shrinkage of the light-transmitting layer between the panes 4 and 5. Furthermore, such spare plastic material 7 reduces the likelihood of inward bulging of the panes 4 and 5 as a direct result of shrinkage of confined material 7. Inward bulging could take place if the panes 4 and 5 are thin and the pressure of atmospheric air at the outer sides of the panes 4 and 5 greatly exceeds the subatmospheric pressure which develops in the space 6 in response to shrinkage of the plastic layer. Finally, the provision of a supply of spare plastic material 7 in the tube 15 insures that the strength of each and every portion of the laminate 1 is the same because the space 6 is completely filled with plastic material 7, not only prior and during but also subsequent to hardening or setting. As a rule, the tube 15 will be withdrawn only when the setting of material 7 in the space 6 is completed.

FIG. 5 further shows several modes of preventing the entrapment of air in the space 6, especially the formation of air pockets in the corner portions of the space 6. This can be achieved by the simple but reliable expedient of slightly tilting the panes 4 and 5 with respect to a horizontal plane during admission of liquid plastic material 7. The laminate 1 of FIG. 5 being a polygonal (rectangular) body, the panes 4 and 5 can be tilted in the following way: In the first step, i.e., during the initial stage of admission of plastic material into an upper left-hand corner portion 21 of the space 6, the panes 4 and 5 are tilted in such a way that a corner portion E1 of the laminate 1 (i.e., the corner portion nearest to the corner portion 21 of the space 6) is moved to a level below the other three corner portions. This causes the admitted liquid plastic material 7 to flow toward the corner portion E1. Successive stages of filling of the space 6 while the corner portion E1 is located at a level below the other corner portions are indicated by the phantom lines L1, L2 and L3. The panes 4 and 5 are thereupon tilted in such a way that a corner portion E2 (at the other side of and more distant from the portion 21) is moved to a level below the other three corner portions. The admitted plastic material 7 then exhibits a tendency to flow toward the corner portion E2. The next following stages of filling of the space 6 with plastic material are indicated by the phantom lines L4, L5, L6 and L7. Air is assumed to escape at a corner portion E3, i.e., diagonally opposite the portion 21. The panes 4 and 5 can but need not be returned into horizontal planes when the space 6 is filled to the extent indicated by the line L5.

The extent of inclination of panes 4, 5 with respect to a truly horizontal plane is preferably small or very small. The inclination depends on viscosity of the plastic material 7 and on certain other factors, such as the desirability of absolutely complete elimination of any and all air pockets in the space 6. It has been found that the likelihood of development of air pockets is reduced if the inclination of panes 4 and 5 with respect to a horizontal plane is such that the inclination causes a desired change in the direction of plastic material flow in the space 6 but does not effect any acceleration of plastic material flow under the action of gravity. The extent to which the panes 4 and 5 will be inclined with respect to the horizontal during admission of plastic material 7 also depends on the height of the space 6, i.e., on the distance between the panes 4 and 5.

It is further within the purview of the invention to impart to the panes 4, 5 and seal 3 or 103 a more complex movement during admission of liquid plastic material 7. For example, the panes 4 and 5 can be caused to swivel about an axis which is normal or substantially normal to their planes and to simultaneously turn back and forth about an axis which is located in the plane of the pane 4 or 5 or in a plane between the two panes 4 and 5. Alternatively, the panes 4 and 5 can be caused to turn about an axis which is normal to their planes and to simultaneously turn back and forth about an axis which is located in or close to the plane of the pane 4 or 5. Such complex movements of the panes hand 5 insure highly reliable filling of the space 6 with plastic material 7.

An apparatus which imparts to the panes 4 and 5 a relatively complex movement during admission of plastic material 7 is shown in FIGS. 8 and 9. The apparatus comprises the aforementioned platform or support 22 which is connected with a ground- or floor-contacting base 27 by means of a joint 24. The joint 24 is a simple structure which allows for pivoting of the support 22 about a single axis, e.g., a horizontal axis located in the plane of FIG. 8. The means for pivoting the support 22 about such axis includes a motor here shown as constituting a cylinder and piston unit. A cylinder 26 of this unit is articulately connected to the base 27 and the upper end of its piston rod 25 is articulately connected to the underside of the support 22 at a locus disposed laterally of the joint 24. The cylinder 26 is preferably of the double-acting type so that it can expel or retract the piston rod 25 to thereby pivot the support 22 and the panes 4, 5 on the support about the aforementioned horizontal axis which is located in the plane of FIG. 8.

The lower pane 4 does not abut directly against the upper side of the support 22. Instead, the latter carries a turntable 28 which may constitute a suction head to attract the underside of the pane 4. The attracting force of the turntable 28 is sufficient to insure that the laminate 1 cannot slide relative thereto even when the motor 25, 26 is actuated to change the inclination of the support 22. If the laminate 1 is relatively large, the apparatus of FIGS. 8 and 9 may comprise a suction pump or other suitable means for evacuating air from the recess in the upper side of the turntable 28 to thus insure an adequate retaining action. The leg 28a of the turntable 28 is rotatably mounted on the support 22. By rotating the laminate 1 about the axis of the leg 28a while the motor 25, 26 changes the inclination of the support 22, one can insure rapid and reliable filling of the space 6 with plastic material 7. The length of the conduit 17 should be sufficient to allow for the turning of the turntable 28 and laminate 1 through an angle which is considered adequate to insure rapid and complete filling of the space 6 with plastic material 7.

FIG. 9 shows that the support 22 can be provided with guide means 29 which allows for shifting of the leg 28a toward and from the central zone of the support 22. For example, the guide means 29 may constitute two grooves one of which extends longitudinally and the other of which extends transversely of the rectangular support 22. By moving the leg 28a in the one or the other groove toward the respective marginal portion of the support 22, the apparatus can be readily converted for the making of smaller or larger laminates 1 while simultaneously insuring that one and the same conduit 17 will suffice for admission of plastic material 7 into the spaces of large, medium-sized or small laminates 1.

FIG. 7 shows a modification of the apparatus of FIGS. 8 and 9. The support 22 of FIG. 7 is mounted on a preferably spherical universal joint 124 (or a Cardan joint) at the upper end of an upright column or base member 123. The spherical joint 124 is connected to the central portion of the underside of the support 22. The latter can be tilted by one or two fluid-operated motors including double-acting or single-acting cylinders 26a, 26a' and associated piston rods 25a, 25a'. The lower ends of the cylinders 26a, 26' are articulately connected to the ground or to the floor, and the upper ends of the piston rods 25a, 25' are articulately connected to spaced-apart portions of the support 22. The angle alpha between the loci of attachment of piston rods 25a, 25a' to the underside of the support 22 (with respect to the vertical axis of the column 123) is assumed to be 90 degrees.

By appropriate actuation of the two motors, one can move the support 22 to a practically infinite number of different inclined positions with respect to a horizontal plane. If desired, actuation of the two motors can be programmed by a system of cams or other suitable means 50 so as to insure that the support 22 is moved to a desired number of different inclined positions in a predetermined sequence. The cams can influence valves (not shown) which serve to admit and evacuate fluid from the chambers of the cylinders 26a and 26a'. The program can be selected in dependency on a number of parameters, such as the height of the space 6 between the panes 4 and 5, the viscosity of plastic material 7, the extent to which the space 6 is filled during a particular stage of admission of plastic material 7 and/or others. In this apparatus, the lower pane 4 can be placed directly onto the upper side of the support 22. The latter may be provided with suitable means for locating the laminate 1 so as to prevent the pane 4 from sliding relative to the upper side of latter 22 while the support changes its inclination in accordance with a preselected pattern.

Instead of cams and/or other mechanical programming means, one can resort to more complex (e.g., electronic) programming devices of any known design. It is further within the purview of the invention to employ one or more detectors (e.g., photoelectric cells) which monitor the extent to which the space 6 is filled with plastic material 7 and transmit appropriate signals to the controls of the motors for the support 22. The detectors are preferably installed in such positions that they can monitor the extent of filling of corner portions of the space 6 with plastic material 7. For example, a cell which monitors the corner E1 of FIG. 5 will transmit a signal when the corner E1 is filled whereupon the two motors of FIG. 7 will cause the support 22 to move the corner E2 to a level below the other three corners.

Still further, one can employ a clock or other suitable timing means which automatically changes the inclination of the support 22 via fluid-operated motors of FIG. 7 in accordance with a predetermined pattern which has been selected empirically and is found to be suitable to insure complete filling of the space 6 with plastic material 7. The provision of such timer as a means for programming the operation of motors for the support 22 is especially desirable when the apparatus is to make a long series of identical laminates 1. The timer need not be very complex, i.e., it often suffices to change the inclination of the support 22 at regular intervals between two, three or four different positions. The apparatus of FIG. 7 enables the panes 4, 5 to turn about several mutually inclined axes, the same as the apparatus of FIGS. 8 and 9.

FIGS. 10 to 15 illustrate the mode of producing a modified laminate 1a. A feature of the laminate 1a is that it does not or need not have a seal so that the laminate 1a can be used with advantage without a frame which normally conceals the seal, such as the seal 3 of FIG. 1. The making of the laminate 1a without a marginal seal is possible by removing the seal in part prior and in part subsequent to setting of plastic material 7 in the space 6 but without any severing of the panes 4 and 5. Such severing is a complex and time-consuming operation; furthermore, severing is not possible if at least one of the panes 4,5 consists of prestressed vitreous material, e.g., when the laminate 1a is to constitute a bulletproof shield or is used for the purpose of preventing or reducing the likelihood of accidents.

The panes 4 and 5 are placed on top of each other (see FIG. 10) and are thereupon moved apart (see FIG. 11) for inserting a distancing element 30, e.g., an elastic cord or a tube which may consist of a suitable elastomeric synthetic plastic material. The material of the distancing element 30 is not adhesive, i.e., it does not adhere to the inner sides of the panes 4 and 5. In the next step, the edge faces 4a, 5a of the panes 4 and 5 are coated with a mass of sealing material which forms a bead 31 completely surrounding the resulting blank (see FIG. 14). The sealing material of the bead 31 is preferably a synthetic plastic substance.

After the material of the bead 31 sets, the space 6 between the panes 4 and 5 (within the confines of the distancing element 30) receives a supply of pressurized fluid (e.g., compressed air) which moves the panes 4 and 5 slightly away from each other, namely to the extent which is necessary to allow for convenient extraction of the distancing element 30 in a manner as shown in FIG. 12. It is sufficient to introduce air at a pressure which slightly relieves the pressure between the element 30 and the panes 4, 5 so that the cord-like element 30 can be readily withdrawn from the space 6 prior to admission of plastic material 7. The opening or openings which are left upon extraction of the distancing element 30 are filled in with a sealing substance (e.g., the material of the bead 31) or are used for admission of plastic material 7 or expulsion of air. For example, if the removal of distancing element 30 resulted in the making of a single opening in the bead 31, such opening can receive a tube 32 (FIG. 12) which is analogous to or identical with one of the tubes 8 in FIG. 1, or a hose or tube which is identical with the hose or tube 15 of FIG. 5. Alternatively, plastic material 7 can be admitted through the same tube (32 in FIG. 12) which was used for admission of compressed air preparatory to withdrawal of the distancing element 30.

It is preferred to fill the space 6 with a metered quantity of plastic material 7 which is calculated in advance by taking into consideration the fact that the distancing element 30 will be withdrawn prior to admission of plastic material 7. Of course, one or more openings for escape of air will be provided to allow for complete filling of the space 6 with plastic material 7. Accurate calculation of the quantity of plastic material 7 which is to be introduced into the space 6 upon removal of the distancing element 30 presents no problems; if no calculation is desired or possible, one can determine th optimum quantity empirically, especially if the apparatus which is used for the making of laminates 1a is designed or intended to make long series of identical laminates 1a. The manner in which the plastic material 7 is admitted into the space 6 and the manner in which the support for the panes 4, 5 of FIGS. 10-15 is caused to change its inclination with respect to a horizontal plane during admission of plastic material 7 is preferably the same as described in connection with FIGS. 1 to 9.

When the material 7 which fills the space 6 sets, the bead 31 is removed, e.g., the bead 31 can be removed by a cutter so that the ultimate product assumes the shape which is shown in FIG. 15, i.e., it merely consists of two panes 4, 5 and a layer of light-transmitting plastic material between the panes. As shown in FIG. 13, the cord-like distancing element 30 can be inserted in such a way that the edge faces 4a, 5a of the panes 4, 5 are tangential to its peripheral surface; this insures that, often the element 30 is removed, the material in the space 6 sets, and the bead 31 is removed, the edge faces of the layer are flush or nearly flush with the edge faces 4a, 5a of the panes 4 and 5.

It is also possible to modify the just described procedure by placing the distancing element 30 inwardly of the edge faces 4a, 5a of the panes 4 and 5 (see the broken-line position 30' of the element 30 in FIG. 13) and to use a bead 31 which consists of light-transmitting synthetic plastic material. When the material in the major part of the space 6 sets, a portion of the bead 31 is removed, i.e., a knife or an analogous tool can be used to remove that portion of the bead 31 which extends outwardly beyond the edge faces 4a, 5a of the panes; the remaining portion of the bead 31 fills the marginal portions of the space 6 and is not distinguishable from the plastic material 7. The resulting laminate 1a is a perfect prism having two flat major surfaces (the exposed major sides of the panes 4 and 5) and four completely flat edge faces. Such laminates 1a are especially desirable for use in places where their marginal portions are not concealed by frames or the like.

It is clear that the structure which is shown in FIG. 14 may constitute the ultimate product. Thus, the bead 31 can be left to constitute a decorative margin or frame for the panes 4, 5, or it can be concealed within a frame which receives a final product. In other words, removal of portions of or the entire bead 31 subsequent to setting of plastic material 7 is optional. The material 7 fills the space 6 of the structure of FIG. 14 all the way to the inner sides of the bead 31.

It is clear that the laminate 1 or 1a may comprise three or more glass panes and two or more intermediate layers of light-transmitting synthetic plastic material 7. For example, the laminate 1 of FIG. 1 can constitute one of the panes in a more complex laminate 201 wherein the pane 4 or 5 of the laminate 1 is spaced apart from a pane (204 in FIG. 16) and the product 201 further comprises a second layer 207 between the laminate 1 and the pane 204. Alternatively, the laminate 201 may be formed by using three panes 4, 5, 204 from the beginning, by resorting to two seals 3 which are respectively placed between the panes 4, 5 and 5, 204, and by simultaneously admitting plastic material 7 into the spaces between the panes 4, 5 and 5, 204. Analogously, one can produce a laminate with four parallel glass panes and three plastic layers, either by assembling the laminate 201 with a further pane or by starting with four discrete glass panes and three discrete seals.

It is further clear that the improved laminate can be used for purposes other than the deadening of sound. Thus, the laminate can be used with equal advantage as a penetration-resistant structure or as a shatterproof body for windshields or the like. For example, the laminate can be used as a shatterproof structure which is highly resistant to penetration of bullets or other missiles and which also exhibits highly desirable soundproofing characteristics.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A method of producing a laminate wherein a layer of light-transmitting synthetic plastic material is sandwiched between two glass panes, particularly a plastic material which enhances the soundproofing qualities of laminate, comprising the steps of locating a first glass pane in a substantially horizontal plane; moving a second pane to a position of substantial parallelism with and above the first pane; maintaining a second pane at a predetermined distance from the first pane so that the panes define a flat space of substantially constant height and sealingly securing the panes to each other all the way around said space, including inserting a seal between the marginal portions of the panes; establishing in the seal a first path for admission into said space, at least at one first location between the panes, of liquefied plastic material which shrinks in response to setting; admitting into said space such quantity of liquefied plastic material that, after setting, the plastic material completely fills said space and prevents inward bulging of the panes; raising the pressure against the upper side of the second pane during and after admission of plastic material to prevent outward bulging of the second pane as a result of admission of plastic material, including drawing air from said space by suction at at least one second location which is disposed between said panes and is remote from said first location; and causing the plastic material in said space to set.

2. A method as defined in claim 1, further comprising the step of closing at least said first path not later than upon completion of setting of said plastic material.

3. A method as defined in claim 1, further comprising the step of assembling the seal of a hard core which prevents a reduction of the distance of said space below said predetermined height and of a binder which at least partially surrounds the core and sealingly contacts the adjacent surfaces of the first and second panes.

4. A method as defined in claim 1, wherein said inserting step comprises placing an elongated distancing element between the marginal portions of the first and second panes and forming a bead of sealing material between the marginal portions of the panes around the distancing element.

5. A method as defined in claim 4, wherein the distancing element is a round cord.

6. A method as defined in claim 4, wherein the distancing element is a flexible tube.

7. A method as defined in claim 4, wherein the distancing element consists of synthetic plastic material.

8. A method as defined in claim 4, wherein the size and shape of said second pane are identical with the size and shape of said first pane and the second pane is in exact register with the first pane, said forming step including coating the edge faces of the first and second panes with the sealing material of the bead.

9. A method as defined in claim 8, wherein the sealing material of the bead is hardenable and is applied to the edge faces of the panes in a deformable state, and further comprising the steps of causing the material of the bead to set and withdrawing the distancing element from the interior of the bead prior to said admitting step.

10. A method as defined in claim 9, further comprising the step of increasing the pressure in said space prior to said withdrawing step so as to reduce the force with which the panes engage the distancing element.

11. A method as defined in claim 9, wherein said withdrawing step includes providing the bead with an opening for removal of the distancing element, and further comprising the step of sealing the opening prior to said admitting step.

12. A method as defined in claim 9, wherein said withdrawing step includes providing the bead with an opening for removal of the distancing element, said opening subsequently constituting one of said paths.

13. A method as defined in claim 9, further comprising the step of removing at least one major part of the bead subsequent to setting of said plastic material.

14. A method as defined in claim 9, wherein said placing step includes locating the distancing element flush with the edge faces of the panes so that, upon withdrawal of the distancing element, the admitted plastic material completely fills the space between the panes all the way to the edge faces of the panes.

15. A method as defined in claim 9, wherein said placing step includes locating the distancing element inwardly of the edge faces of the panes and said forming step includes introducing the plastic material of the bead between the panes all the way around the distancing element.

16. A method as defined in claim 1, wherein said admitting step includes metering the quantity of liquefied plastic material prior to admission of such material into said space so that the metered quantity at least closely approximates the volume of said space subsequent to setting of such metered quantity.

17. A method as defined in claim 1, further comprising the step of changing the inclination of the panes in the course of admission of liquefied plastic material so as to promote complete filling of said space with plastic material.

18. A method as defined in claim 1, wherein said admitting step includes metering the quantity of liquefied plastic material prior to admission of such material into the space between the panes so that the material completely fills the space without causing any outward bulging of the panes.

19. A method as defined in claim 1, wherein said seal is an adhesive seal between the marginal portions of the panes so that the panes adhere to the seal.

20. A method as defined in claim 19, wherein the seal is adhesive in response to the application of pressure.

21. A method as defined in claim 1, wherein the panes have identical polygonal shapes and identical sizes and the second pane is in exact register with the first pane, said first location being at one corner of the space between the panes and said second location being at another corner.

22. A method as defined in claim 21, wherein said second location is disposed opposite said first location.

23. A method as defined in claim 21, wherein said panes have more than three corners including a third corner at one side and a fourth corner at the other side of the one corner, and further comprising the steps of moving first the third corner and thereupon the fourth corner to a level below all other corners during said admitting step.

24. A method as defined in claim 23, wherein the third corner is nearer to the one corner than the fourth corner.

25. A method as defined in claim 1, further comprising the steps of changing the inclination of the panes with respect to a horizontal plane and simultaneously turning the panes about an axis which is normal to the planes of the panes during said admitting step.

26. A method as defined in claim 1, wherein the panes are polygonal and in exact register with each other, said first location being disposed at one corner of the space between the registering panes.

27. A method as defined in claim 26, wherein the seal is of finite length and has two discrete faces at said one corner, said step of establishing said first path including inserting a tube between the faces of the seal at said one corner and the admitting step including introducing liquefied plastic material into said space by way of said tube.

28. A method as defined in claim 27, wherein said tube is elastic and further comprising the step of propping the tube from within to insure the establishment of said first path for admission of liquefied plastic material.

29. A method as defined in claim 27, wherein said tube is deformable and further comprising the step of deforming the tube so as to close said first path upon completed filling of said space with plastic material.

30. A method as defined in claim 1, wherein said locating step includes attracting the underside of the first pane to a substantially horizontal support by suction.

31. A method as defined in claim 30, further comprising the step of tilting the support about a substantially horizontal axis and turning the support about a substantially vertical axis during said admitting step.

32. A method as defined in claim 1, wherein said step of establishing said first path includes inserting a tube between the first and second panes, and said admitting step includes introducing plastic material into said space by way of the tube, and further comprising the step of withdrawing the tube upon setting of the plastic material.

33. A method as defined in claim 1, wherein said first establishing step includes providing several first paths for admission of plastic material into said space.

34. A method as defined in claim 1, wherein said second establishing step includes providing several second paths for expulsion of air from said space during said admitting step.

* * * * *

UNITED STATES PATENT AND TRADEMARK OFFICE
CERTIFICATE OF CORRECTION

PATENT NO. : 4,299,639

DATED : November 10, 1981

INVENTOR(S) : Franz BAYER

It is certified that error appears in the above-identified patent and that said Letters Patent are hereby corrected as shown below:

Col. 15, line 17, "height" should read --distance--;

line 59, "one" should read --the--.

Signed and Sealed this

Tenth Day of May 1983

[SEAL]

Attest:

GERALD J. MOSSINGHOFF

Attesting Officer

Commissioner of Patents and Trademarks